No. 669,795.

B. HURD.
CABLE CLIP.
(Application filed Jan. 12, 1901.)

(No Model.)

Patented Mar. 12, 1901.

Witnesses
T. E. Grafton
Geo. W. Hess

Benjamin Hurd Inventor
By his Attorney
C. V. Edwards

UNITED STATES PATENT OFFICE.

BENJAMIN HURD, OF NEW YORK, N. Y.

CABLE-CLIP.

SPECIFICATION forming part of Letters Patent No. 669,795, dated March 12, 1901.

Application filed January 12, 1901. Serial No. 43,074. (No model.)

*To all whom it may concern:*

Be it known that I, BENJAMIN HURD, a citizen of the United States, residing at New York, in the county of New York and State of New York, have invented certain new and useful Improvements in Cable-Clips, of which the following is a full, clear, and exact specification.

This invention relates to devices for supporting cables and the like, and has particular reference to the clips used for supporting the main cable from the supporting or messenger wire or cable.

The object of the invention is to provide a simple device of the character described which shall be exceedingly cheap to manufacture, easily applied, and capable of application to various sizes of cables and wires without adjustment.

The invention and its application will be more fully described with reference to the accompanying drawings, in which—

Figure 1:
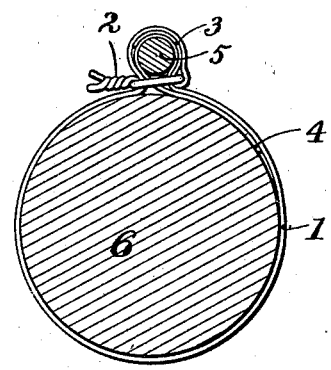
Figure 2:
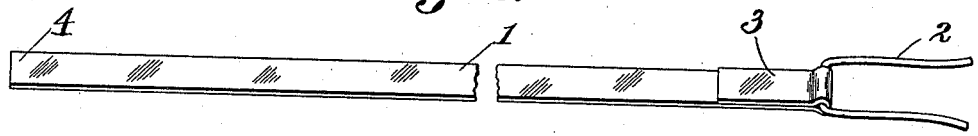

Figure 1 is a sectional view of a clip embodying the invention and showing the same in position, and Fig. 2 is a plan view of the clip unattached.

Referring more particularly to the drawings, 1 represents a flat strip of suitable material, preferably zinc or other metal, having an open-ended fastening device 2, attached to one end thereof. Preferably this fastening device comprises a suitable wire of flexible material, preferably bent U-shaped and attached to the strip 1 by bending the end 3 thereof over the yoke of the fastening device, as shown.

In applying the device the end 4 of the strip is laid upon the cable to be supported, as shown in Fig. 1, the strip passing between the supporting-cable or messenger-wire 5 and the main cable 6 and the part 3 of the strip being uppermost. The strip is then bent over the wire 5, around the cable 6, and over the wire 5 again. When in this position, the ends of the fastening-wire 2 are passed between wires 5 and 6, one end on each side of the strip. The ends of the wires are then twisted together, preferably by a pair of pliers, thus drawing the parts together and bringing them into substantially the positions shown in Fig. 1. By varying the extent to which the ends 2 are twisted the parts of the strip surrounding the wire may be made to embrace the latter, so as to bind the same with varying tightness. This will permit the clips to be attached when the wires are on the ground, if desired, and afterward slipped into position, the two cables adjusting their relative positions themselves. After the cables are in position the weight of the supported cable tends to draw the parts of the clip more tightly together, and the twisting of the ends of the fastening-wire 2 will slightly indent the edges of the strip 1, so as to prevent slipping of the parts.

The strip may be passed over the messenger-wire but once, if so desired; but such application is obviously weaker and less practical than that heretofore described.

The application of the device to various sizes of cables is permitted by merely varying the position of the end 4 upon the supported cable.

Having thus described my invention, what I claim as new, and desire to secure by Letters Patent, is—

1. In a device of the character described, the combination of a flat flexible strip, and an open-ended fastening device attached to one end thereof, said fastening device being adapted to straddle and fasten the parts of the strip between the messenger-wire and cable after the strip has been passed over the same.

2. In a device of the character described, the combination of a flat flexible strip, and a U-shaped fastening device attached to one end thereof, and said fastening device being adapted to straddle and fasten the parts of the strip between the messenger-wire and cable after the strip has been passed over the same, as set forth.

3. In a device of the character described, the combination of a flat flexible strip, and a U-shaped fastening-wire, one end of said strip being bent over the yoke of said wire and said fastening device being adapted to straddle and fasten the parts of the strip between the messenger-wire and cable after the strip has been passed over the same, for the purpose set forth.

4. A cable-clip comprising a flat strip adapted to be laid upon the cable and passed between the same and the messenger-wire, over the latter and around the under side of the cable and over the messenger-wire, and an open-ended fastening device attached to one end of the strip and adapted to be passed between the wire and the cable, straddling the strip, and fastened on the outside thereof, substantially as described.

In testimony whereof I affix my signature in presence of two witnesses.

BENJAMIN HURD.

Witnesses:
T. E. GRAFTON,
GEO. W. HESS.